(12) United States Patent
Bong et al.

(10) Patent No.: US 8,590,295 B2
(45) Date of Patent: Nov. 26, 2013

(54) EXHAUST PIPE STRUCTURE OF VEHICLE

(75) Inventors: Ha-Dong Bong, Ansan-shi (KR); Sang-Il Lee, Soowon-shi (KR); Ho-Chan An, Seoul (KR); Young-Ho Han, Hwasung-shi (KR); Il-Joong Hwang, Ansan-shi (KR); Sung-Soo Chae, Soowon-shi (KR); Hak-Son Han, Sungnam-shi (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 264 days.

(21) Appl. No.: 12/835,485

(22) Filed: Jul. 13, 2010

(65) Prior Publication Data

US 2011/0126526 A1    Jun. 2, 2011

(30) Foreign Application Priority Data

Nov. 30, 2009  (KR) .................. 10-2009-0116998

(51) Int. Cl.
   *F01N 1/00*  (2006.01)
(52) U.S. Cl.
   USPC ................................. 60/323; 60/322; 60/302
(58) Field of Classification Search
   USPC ................ 60/323, 322, 302; 180/296, 309
   See application file for complete search history.

(56) References Cited

U.S. PATENT DOCUMENTS

| | | | | |
|---|---|---|---|---|
| 5,152,138 A | * | 10/1992 | Tanabe et al. | 60/313 |
| 5,170,557 A | * | 12/1992 | Rigsby | 29/890.08 |
| 5,349,817 A | * | 9/1994 | Bekkering | 60/322 |
| 6,182,447 B1 | * | 2/2001 | Hashimura et al. | 60/323 |
| 6,374,600 B2 | * | 4/2002 | Uegane et al. | 60/322 |
| 6,581,377 B2 | * | 6/2003 | Carlson et al. | 60/323 |
| 6,918,246 B2 | * | 7/2005 | Fukumoto et al. | 60/323 |
| 2003/0182937 A1 | * | 10/2003 | Fukumoto et al. | 60/323 |
| 2009/0266066 A1 | * | 10/2009 | Luce et al. | 60/323 |

FOREIGN PATENT DOCUMENTS

| | | |
|---|---|---|
| JP | 2001-3742 A | 1/2001 |
| JP | 2003-71528 A | 3/2003 |
| JP | 2003-166423 A | 6/2003 |

* cited by examiner

*Primary Examiner* — Binh Q Tran
*Assistant Examiner* — Matthew T Largi
(74) *Attorney, Agent, or Firm* — Morgan, Lewis & Bockius LLP

(57) ABSTRACT

An exhaust pipe structure of a vehicle having a left manifold disposed in front of an engine and a right manifold disposed behind the engine along a longitudinal direction of the vehicle, which are connected by an underbody catalytic converter, the exhaust pipe structure may include a left exhaust pipe connected to the left manifold and extending toward the rear of the engine, a right exhaust pipe having a straight portion connected to the right manifold and extending toward the front of the engine and a curved portion bending from the straight portion toward the rear of the engine, and a conjunction, one end of which is connected to and communicates with the end of the curved portion of the right exhaust pipe and the end of the left exhaust pipe and the other end of which is connected to the underbody catalytic converter.

7 Claims, 5 Drawing Sheets

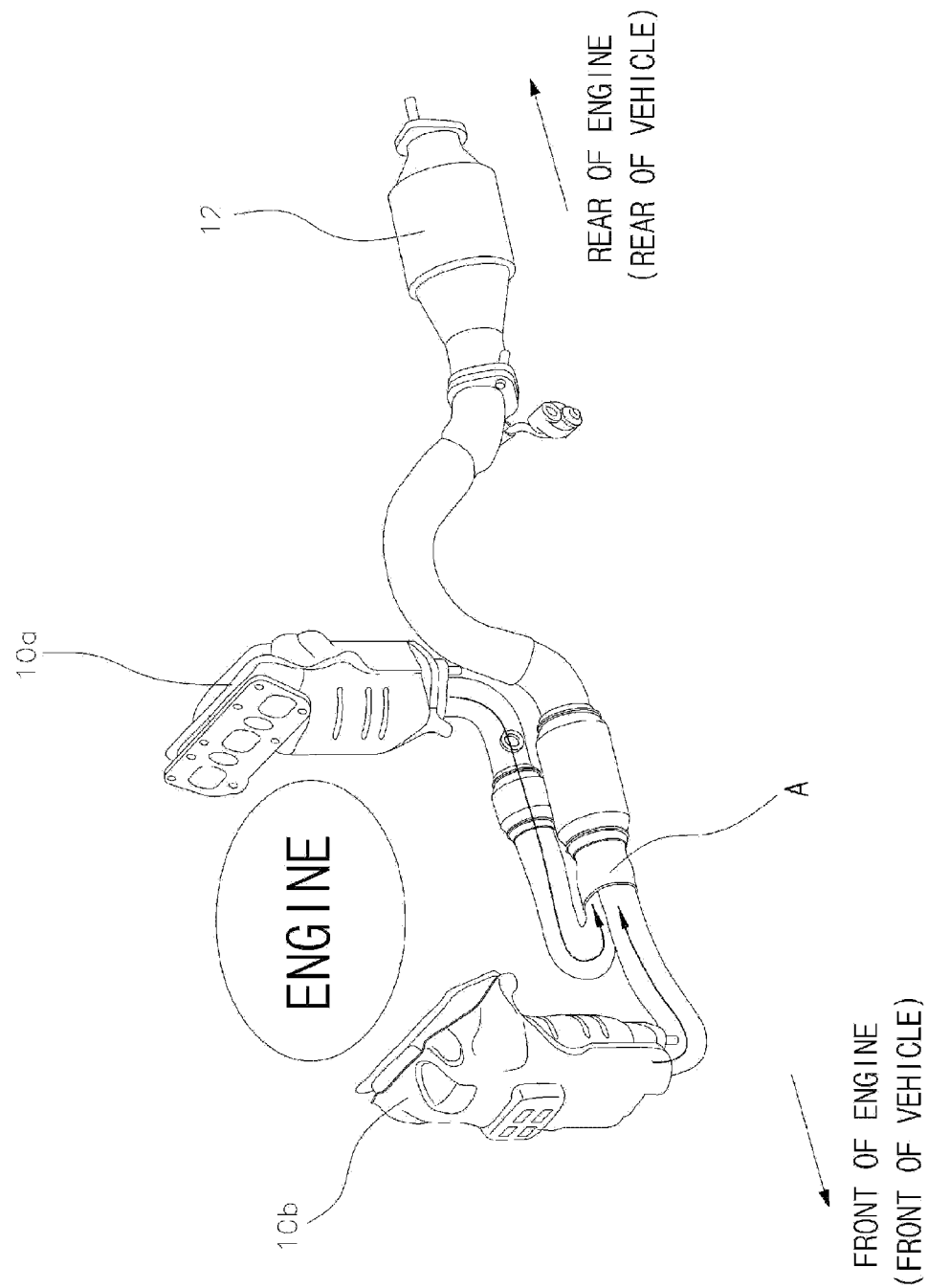

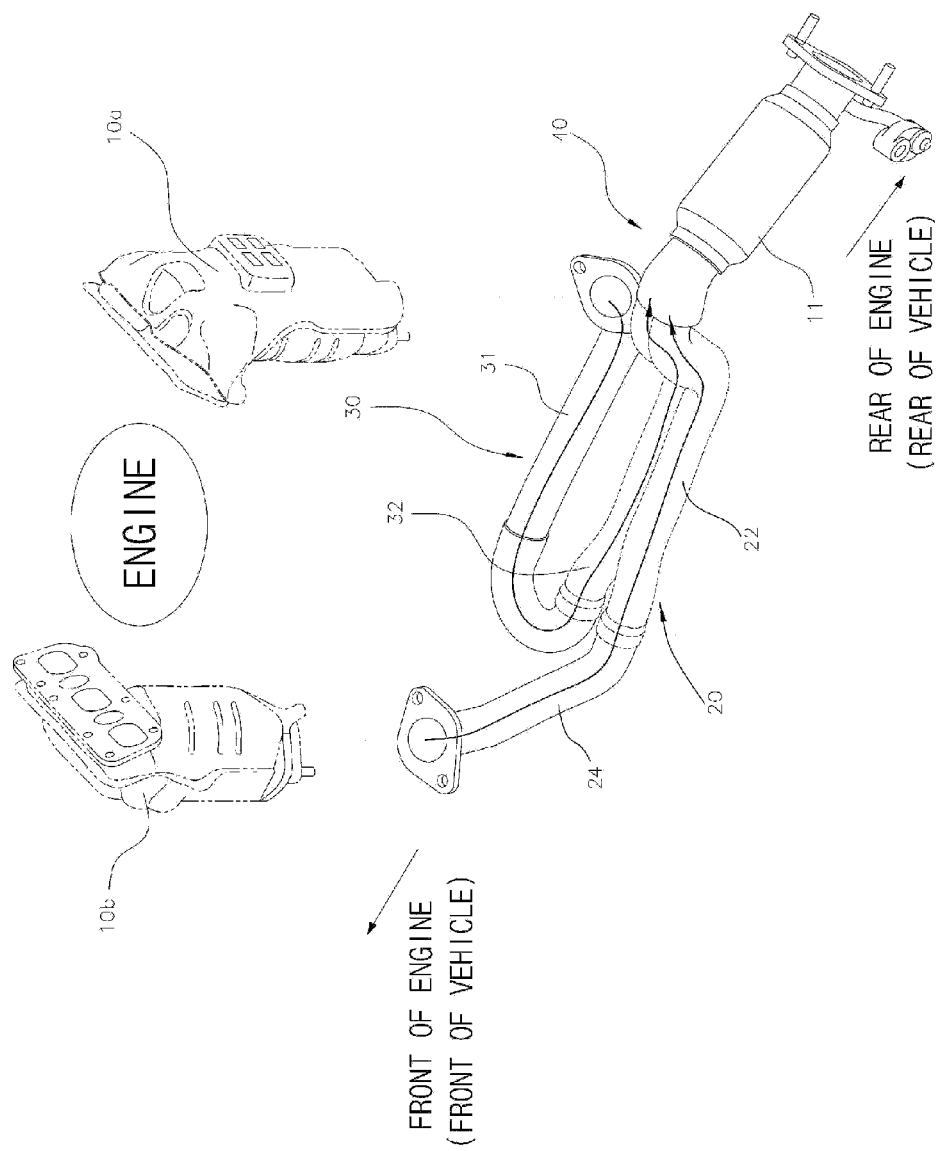

A-A CROSS SECTION

FIG. 4
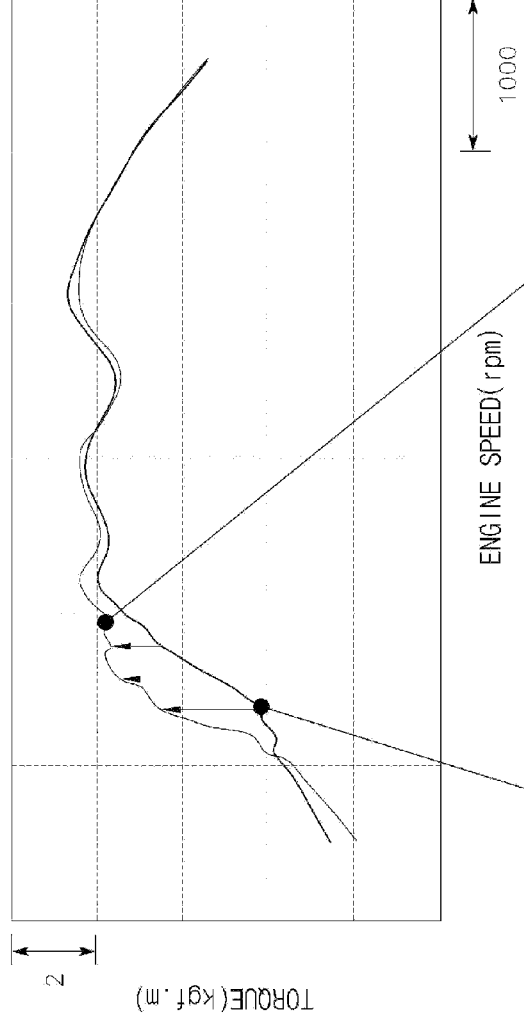

EXHAUST PIPE STRUCTURE OF VEHICLE

CROSS-REFERENCE TO RELATED APPLICATION

The present application claims priority to Korean Patent Application No. 10-2009-0116998, filed on Nov. 30, 2009, the entire contents of which is incorporated herein for all purposes by this reference.

BACKGROUND OF THE INVENTION

1. Field of the Invention

The present invention relates to a structure of an exhaust pipe system of a vehicle, in more detail, an exhaust pipe structure of a vehicle having exhaust performance improved by improving the structure of an exhaust pipe such that exhaust gas discharged from both sides of an engine smoothly flows without interfering with each other.

2. Description of Related Art

The driving method of vehicles is classified into FF, FR, RR, and 4WD etc., in accordance with the position of the engine and whether the driving shaft is connected to the front wheels or rear wheels.

Although the driving methods each have merits and demerits, in general, the FR (Front engine, Rear wheel drive) and FF (Front engine, Front wheel drive) have been widely used for cars.

The engines of cars are classified into a straight engine and a V-type engine in accordance with the arrangement of cylinders. The V-type engine, including cylinders arranged in a V-shape with respect to the crankshaft, makes it relatively easy to reduce the volume of the engine, such that it is applied when there are several cylinders with large displacement.

When the V-type engine is equipped in a vehicle, the pipe structure of the exhaust system is made different in accordance with the driving method of the vehicle.

The exhaust pipe shown in FIG. 1A has a structure for FF type vehicles and the exhaust pipe shown in FIG. 1B has a structure for FR type vehicles.

As shown in FIG. 1B, since FR type vehicles were equipped with an engine with cylinders arranged in the front-rear direction of the vehicles, exhaust pipes could extend from the manifolds at both sides of the engine and an UCC (Underbody Catalytic Converter) 12a and 12b could be disposed at the middle portion of each of the exhaust pipes. However, it was above all possible to reduce interference between exhaust gases by disposing the conjunction of the manifolds 10a and 10b far from the cylinders of the engine.

Combustion gases that are generated by the cylinders in an engine are generated in accordance with the ignition order of the cylinders. The combustion gas is delivered by a difference in density generated when an exhaust valve is opened/closed. This is called exhaust inertia effect, which is a phenomenon that sucks remaining gas in the cylinder right before the exhaust valve is closed, and depends on the shape and arrangement of the exhaust pipe. Exhaust efficiency of combustion gas is reduced, for example, when combustion gas discharged out of a cylinder interferes with combustion gas discharged out of another cylinder gas and flowing through an exhaust pipe. Although it is preferable to make the manifolds of the cylinder sufficiently long, in order to reduce exhaust interference, the exhaust system should be configured such that the exhaust gases discharged from the manifolds at both side join together at a point sufficiently far from the cylinders.

However, as shown in FIG. 1A, the conjunction A of combustion gases discharged from the manifolds 10a and 10b at both sides is positioned ahead of the underbody catalytic converter 12 in FF type vehicles equipped with an engine having cylinders arrange perpendicular to the vehicles, in consideration of the chassis structure and layout. That is, as shown in the figure, FR type vehicles are configured such that combustion gases join after passing through the underbody catalytic converter that filters toxic substances, whereas FF type vehicles are configured such that exhaust gases already join before entering the UCC. Therefore, the structure of the exhaust system of FF type vehicles is more influenced by exhaust interference than the structure of the exhaust system of FR type vehicles.

Since the exhaust pipe of FF type vehicles is relatively short from the manifolds to the conjunction of exhaust gases due to the reasons described above, torque is reduced when the engine runs at a low revolution speed.

Further, although it is possible to reduce exhaust interference by disposing an underbody catalytic converter at a predetermined rear position and the conjunction behind the underbody catalytic converter, in this configuration, the underbody catalytic converter may malfunction due to temperature drop of exhaust gas.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an exhaust pipe in which combustion gases, which have passed through a WCC (Warm-up Catalytic Converter) integrally formed in the manifolds without changing the position of an underbody catalytic converter, join at a rear position as far as possible from an engine before entering the underbody catalytic converter.

An exhaust pipe structure of a vehicle having a left manifold disposed in front of an engine and a right manifold disposed behind the engine along a longitudinal direction of the vehicle, which are connected by an underbody catalytic converter, the exhaust pipe structure may include a left exhaust pipe connected to the left manifold and extending toward the rear of the engine, a right exhaust pipe having a straight portion connected to the right manifold and extending toward the front of the engine and a curved portion bending from the straight portion toward the rear of the engine, and a conjunction, one end of which is connected to and communicates with the end of the curved portion of the right exhaust pipe and the end of the left exhaust pipe and the other end of which is connected to the underbody catalytic converter.

The curved portion of the right exhaust pipe may extend in parallel with the left exhaust pipe and may be combined with the left exhaust pipe in surface contact with each other.

Surface contact portions may be formed between the curved portion and the left exhaust pipe and each cross section of the surface contact portions are in semicircular pipe shapes facing each others, wherein the surface contact portions are manufactured by hydro-forming.

The conjunction may have an insulating member that attenuates vibration transmitted from the left exhaust pipe and the right exhaust pipe, and is connected to the underbody catalytic converter by the insulating member, wherein the conjunction is disposed higher than the left exhaust pipe and the curved portion of the right exhaust pipe, wherein the conjunction is disposed higher than the straight portion of the right exhaust pipe, wherein the ends of the left exhaust pipe and the curved portion are bent upwards and connected to the conjunction directly coupled to the insulating member, and wherein the conjunction and the insulting member are disposed tilted downwards from the ends of the left exhaust pipe and the curved portion with a predetermined angle.

The present invention having the configuration described above has the advantage of improving torque and fuel efficiency of an engine at low-speed and middle-speed regions by reducing exhaust interference, and improving start acceleration and drivability by the increase of torque.

Since two semicircular pipes manufactured by hydroforming are in surface contact with each other in the exhaust pipe, performance is improved, but volume is not increased, as compared with exhaust pipes of the related art, such that it is advantageous in the space availability respect.

Further, it has the advantage of delivering combustion gas without loosing temperature to the underbody catalytic converter with one pipe.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 1A is a perspective view showing an exhaust pipe of the related art which is equipped in FF vehicles.

FIG. 2 is a perspective view showing an exemplary exhaust pipe according to the present invention.

FIG. 4 is a data graph showing a comparison test of the exhaust pipe of the related art shown in FIG. 1 and an exemplary exhaust pipe according to the present invention.

Figure 1B:
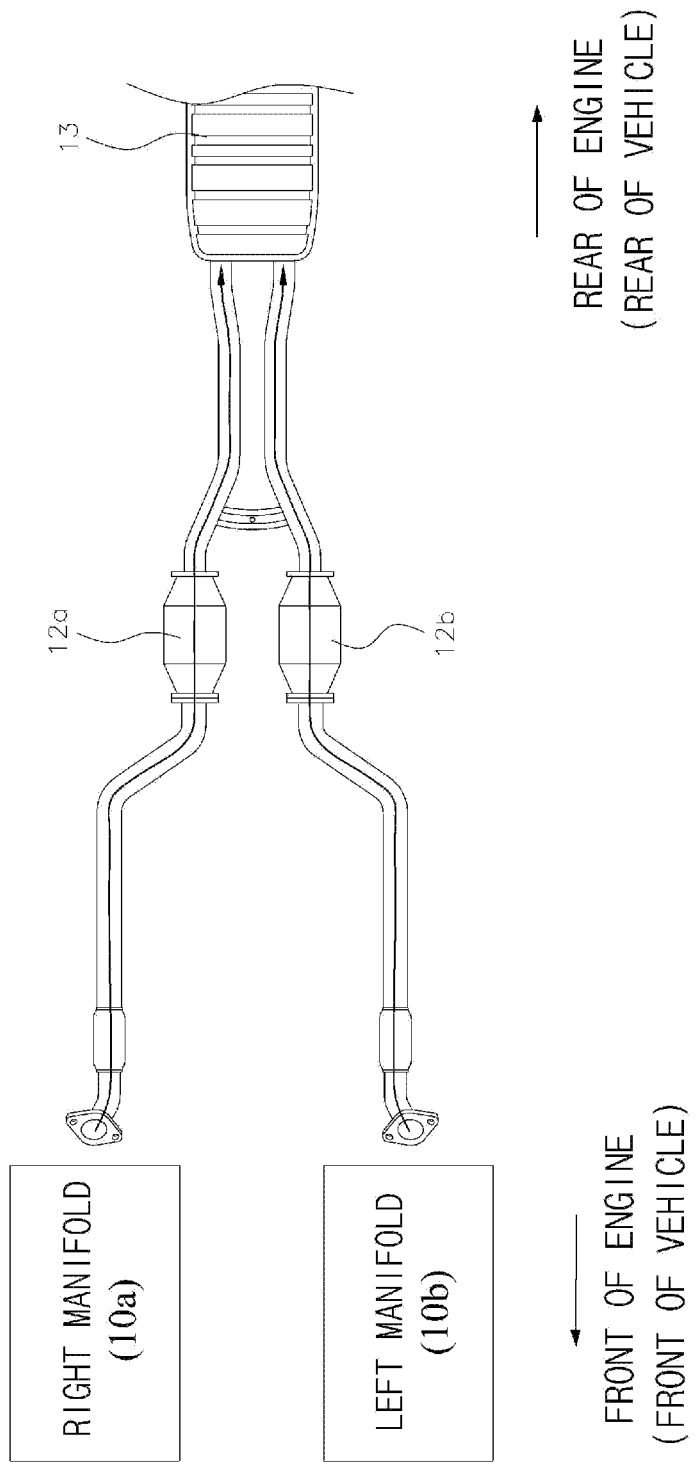
FIG. 1B is a plan view showing an exhaust pipe of the related art that is equipped in FR vehicles.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The structure of an exhaust pipe according to exemplary embodiments of the present invention is described hereafter in more detail with the accompanying drawings.

Referring to FIG. 2, according to an exemplary exhaust pipe of the present invention, a left manifold 10b is disposed ahead of an engine, i.e., at the front portion of a vehicle and a right manifold 10a is disposed behind the engine in connection to the rear of the engine.

The exhaust pipe is configured to deliver combustion gases generated by both manifolds 10a and 10b to a UCC (Underbody Catalytic Converter). Therefore, a right exhaust pipe 30 and a left exhaust pipe 20 are connected to the lower portion of the manifolds 10a and 10b, respectively, in which the ends of the right exhaust pipe 30 and the left exhaust pipe 20 communicate with a conjunction 40 connected to the UCC.

As shown in the figure, the left exhaust pipe 20 partially bends at one side of the right exhaust pipe 30 to form an upper portion 24 and then extends toward the rear of the engine (the rear of the vehicle) to form a lower portion 22, whereas the right exhaust pipe 30 extends toward the front of the engine and bends back at 180° toward the rear of the engine. That is, the right exhaust pipe 30, as shown in the figure, is formed in a U-shape and disposed parallel with one side of the left exhaust pipe 20.

For reference, the portion connected to the right manifold 10a is defined as a straight portion 31 and the portion adjacent to the left exhaust pipe 20 is defined as a curved portion 32, which are divided with reference to the curved portion of the right exhaust pipe 30, for the convenience of description herein.

Figure 3A:
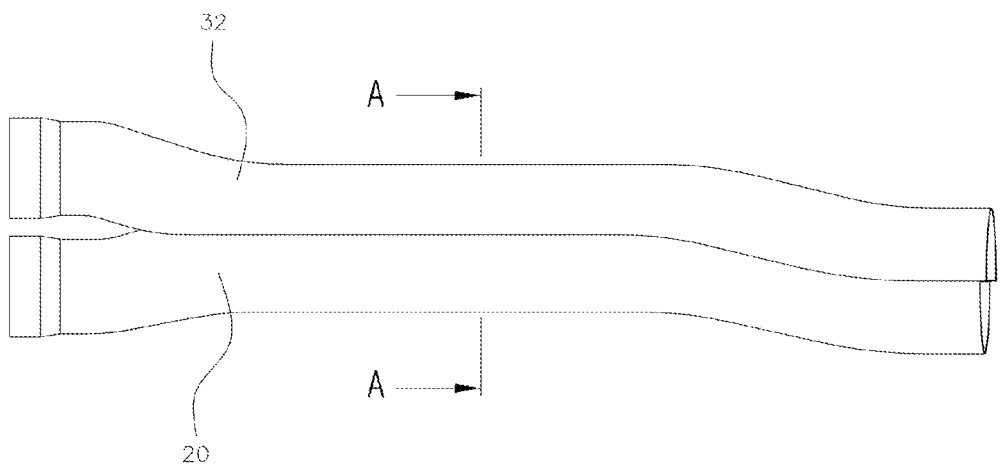
FIG. 3A is an enlarged plan view showing the portion indicated by dashed lines in FIG. 2.
Figure 3B:
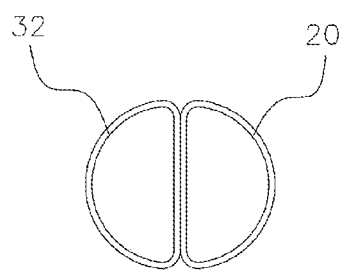
FIG. 3B is a cross-sectional view taken along the line A-A of FIG. 3A.

The reason that the right exhaust pipe 30 is bent as described above is for reducing as much as possible exhaust interference by elongating the flow channel of combustion gas, as described above. The lower portion 22 of left exhaust pipe 20 and the curved portion 32 of the right exhaust pipe 30 are in close contact with each other from a predetermined point to the front end of the conjunction 40. The portion indicated by dashed lines in FIG. 2 is shown in FIG. 3A and FIG. 3B is a cross-sectional view taken along line A-A of FIG. 3A. As shown in the figures, the left exhaust pipe 20 is in close contact with the curved portion 32 in a predetermined section and the vertical cross section of the contact portions has a semicircular shape. That is, the left exhaust pipe 20 and the curved portion 32 each have a semicircular pipe shape divided into two equal parts from a cylinder in the contact section, and make one cylindrical shape by combining to face each other. The ends of the left exhaust pipe 20 and the curved portion 32 combined as described above communicate with each other at the conjunction, which has a cylindrical shape. For reference, as shown in FIG. 2, the ends of the left exhaust pipe 20 and the curved portion 32 are bent upward, which is for increasing the length to reduce exhaust interference, as described above. Further, it is preferable to make the straight portion 31 longer than the curved portion 32 in the right exhaust pipe 30 in order to dispose the conjunction of exhaust gas as close as possible to the rear of the vehicle.

Meanwhile, the conjunction 40, as described above, is a cylindrical pipe and has an insulating member 11 at the middle portion to attenuate noise and vibration caused by the flow of exhaust gas. Therefore, combustion gases collected by the right manifold 10a and the left manifold 10b flow through the right exhaust pipe 30 and the left exhaust pipe 20, join at the conjunction 40, and then flows to the UCC connected to the conjunction 40, with noise and vibration reduced across the insulating member 11.

As described above, in the exhaust pipe according to an embodiment of the present invention is preferably manufactured by hydro-forming to have the semicircular pipe shape such that bending pressure is uniformly distributed in each portion, including the curved portion.

FIG. 4 is a data graph showing a comparison test of the exhaust pipe of the related art shown in FIG. 1 and an exhaust pipe according to an embodiment of the present invention.

As described above, it can be seen from the graph that there was little difference in the rpm-region where the internal pressure of the exhaust pipes was relatively high due to a large amount of discharged combustion gas, whereas torque increased by 4 to 8% in the exhaust pipe according to an embodiment of the present invention more than the exhaust pipe of the related art, at the rpm-region where the internal pressure of the exhaust pipes was relatively low, because exhaust interference was reduced.

For convenience in explanation and accurate definition in the appended claims, the terms "upper", "lower" "front", "rear", "left", and "right" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An exhaust pipe structure of a vehicle having a left manifold disposed in front of an engine and a right manifold disposed behind the engine along a longitudinal direction of the vehicle, which are connected by an underbody catalytic converter, the exhaust pipe structure comprising:
   a left exhaust pipe, a front end of which is connected to the left manifold wherein the left exhaust pipe extends toward the rear of the engine, the left exhaust pipe having:
      a lower portion, one end portion of which extends toward the rear of the engine;
      an upper portion extending upwards from the other end portion of the lower portion and having the front end;
   a right exhaust pipe having:
      a straight portion, a rear end of which is connected to the right manifold, wherein the straight portion extends toward the front of the engine; and
      a curved portion bending from the straight portion toward the rear of the engine; and
   a conjunction having:
      a front end thereof being connected to and communicating with a rear end of the curved portion of the right exhaust pipe and a rear end of the left exhaust pipe; and
      a rear end thereof being connected to the underbody catalytic converter;
   wherein the straight portion of the right exhaust pipe extends at least as far as a length of the lower portion of the left exhaust pipe;
   wherein the curved portion of the right exhaust pipe extends in parallel with the lower portion of the left exhaust pipe and is combined with the left exhaust pipe in surface contact with each other;
   wherein surface contact portions are formed between the curved portion and the lower portion of the left exhaust pipe and each cross section of the surface contact portions are in semicircular pipe shapes facing each others;
   wherein the conjunction has an insulating member that attenuates vibration transmitted from the left exhaust pipe and the right exhaust pipe, and is connected to the underbody catalytic converter by the insulating member;
   wherein the conjunction is disposed higher than the lower portion of the left exhaust pipe and the curved portion of the right exhaust pipe;
   wherein the curved portion is formed equal to or longer than the straight portion; and
   wherein the conjunction is disposed behind the straight portion of the right exhaust pipe in a rearward direction of the engine.

2. The exhaust pipe structure of the vehicle according to claim 1, wherein the surface contact portions are manufactured by hydro-forming.

3. The exhaust pipe structure of the vehicle according to claim 1, wherein the conjunction is disposed higher than the straight portion of the right exhaust pipe.

4. The exhaust pipe structure of the vehicle according to claim 1, wherein the ends of the left exhaust pipe and the curved portion are bent upwards and connected to the conjunction directly coupled to the insulating member.

5. The exhaust pipe structure of the vehicle according to claim 4, wherein the conjunction and the insulting member are disposed tilted downwards from the ends of the left exhaust pipe and the curved portion with a predetermined angle.

6. The exhaust pipe structure of the vehicle according to claim 1, wherein the ends of the left exhaust pipe and the curved portion are bent upwards and connected to the conjunction.

7. The exhaust pipe structure of the vehicle according to claim 6, wherein the conjunction is disposed tilted downwards from the ends of the left exhaust pipe and the curved portion with a predetermined angle.

* * * * *